United States Patent
Yatagai (12)

(10) Patent No.: US 6,334,731 B1
(45) Date of Patent: Jan. 1, 2002

(54) CONNECTOR AND FIXING METHOD THEREOF

(75) Inventor: Tsuyoshi Yatagai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/515,853

(22) Filed: Feb. 29, 2000

(30) Foreign Application Priority Data

Mar. 1, 1999 (JP) .................................... 11-052101

(51) Int. Cl.[7] ................................................ B25G 3/28
(52) U.S. Cl. ....................... 403/270; 403/271; 403/187; 403/256
(58) Field of Search ................................ 403/270, 271, 403/187, 188, 192, 193, 194, 195, 256, 258, 257

(56) References Cited

U.S. PATENT DOCUMENTS

| | | | | |
|---|---|---|---|---|
| 3,668,612 A | * | 6/1972 | Nepovim | 403/195 |
| 3,798,586 A | * | 3/1974 | Huska | 403/195 |
| 5,278,358 A | | 1/1994 | Blondin | |
| 5,308,183 A | * | 5/1994 | Stegemann et al. | 403/258 |
| 5,573,423 A | | 11/1996 | Lin et al. | |

FOREIGN PATENT DOCUMENTS

| EP | 0640786 A2 | 1/1995 |
|---|---|---|
| FR | 2728047 A1 | 6/1996 |
| FR | 2758400 | 6/2000 |

OTHER PUBLICATIONS

European Search Report dated Jun. 14, 2000.

* cited by examiner

*Primary Examiner*—Lynne H. Browne
*Assistant Examiner*—Aaron Dunwoody
(74) *Attorney, Agent, or Firm*—McGinn & Gibb, PLLC

(57) ABSTRACT

A connector and a fixing method of this connector, which in particular are used for a submarine apparatus, in which in case that the connector is fixed to the submarine instrument tail cable, a polyethylene sheath covering the submarine instrument tail cable is prevented from melting at brazing process, are provided. A connector main body, a setscrew having slit whose direction is its stretching direction, a coupling end component, and a pipe into which the tail cable is inserted are provided. And the pipe is connected to the submarine instrument tail cable. First, the connector main body and the pipe are brazed together by heat without setting the setscrew having slit. And after the brazing process, the setscrew having slit is set to the pipe through the slit, and then the setscrew having slit is fitted to the connector main body. As a result, the heating process can be performed efficiently and the heating time can be reduced and the polyethylene sheath is prevented from melting.

13 Claims, 8 Drawing Sheets

CONNECTOR AND FIXING METHOD THEREOF

BACKGROUND OF THE INVENTION

The present invention relates to a connector and a fixing method of this connector, which in particular are used for a submarine apparatus.

Description of the Related Art

FIG. 1 is a side view showing a basic structure of a submarine apparatus, to which the present invention is applied. As shown in FIG. 1, submarine instrument tail cables 4 are taken out from a submarine instrument 1 and connectors 5 are fixed to the submarine instrument tail cables 4. Optical fibers 6 are taken out from the connectors 5. And as shown in FIG. 2, a coupling end component 15 is fixed to the connector 5. The coupling end component 15 is fitted in a coupling part containing box 41 being watertight construction, as shown in FIG. 3. The optical fiber 6 connects to a submarine optical tail cable 2 in the coupling part containing box 41. The coupling part containing box 41 is covered with polyethylene sheath 81 as shown in FIG. 4. And a completed basic structure of the submarine apparatus is shown in FIG. 5 and consists of the submarine instrument 1, couplings 3 and the submarine optical tail cables 2. As shown in FIG. 5, the couplings 3 are connected to the both sides of the submarine instrument 1 and the submarine optical tail cables 2 are taken out from the couplings 3. In this coupling 3, the connector 5 and other related components are provided.

FIG. 6 is a side view showing a structure of a conventional connector. The conventional connector is a type of connector fixed by a setscrew. FIG. 7 is a perspective view showing the setscrew using for the conventional connector. Referring to FIGS. 6 and 7, the conventional fixing method is explained. As shown in FIG. 6, this conventional connector has a structure in which a ring shaped setscrew 27 is inserted into a connector main body 101. At the case that the connector is fixed to a submarine instrument tail cable 4, a metal pipe 9, into which a core fiber part of the submarine instrument tail cable 4 is to be inserted, is inserted into the connector main body 101 provided the ring shaped setscrew 27, and the metal pipe 9 is jointed at a brazing part 14 to the tip of the connector main body 101.

Generally, a brazing material is heated up to about 800 to 1000° C. by using a burner and the brazing is performed. However, at the case of the submarine instrument tail cable covered with polyethylene sheath, which is melted at about 200° C., the burner is not used and an electric resistance brazing method or a high frequency brazing method, in which the heating temperature or heating time can be accurately controlled, is applied to heat the brazing material.

FIG. 8 is a diagram showing a conventional brazing structure by using the electric resistance brazing method. As shown in FIG. 8, small electrodes 30 and 31 are made to contact a narrow region being near to the tip part 28, exposed from the ring shaped setscrew 27, of the connector main body 101, and a current is made to flow into the electrodes 30 and 31 and the brazing part is heated. After reaching a designated temperature, a brazing material 29 is given to the border part between the metal pipe 9 and the tip part 28 of the connector main body 101 and the brazing is performed. FIG. 9 is a diagram showing a conventional brazing structure by using the high frequency brazing method. As shown in FIG. 9, a coil 34 is set at the near part for brazing, a high frequency current is flown into the coil 34 and an induced current is generated at the near part of the tip part 28 of the connector main body 101 and the metal pipe 9, and the brazing part is heated. The method giving the brazing material 29 is the same as that of the electric resistance brazing method.

However, even at the case that the electric resistance brazing method or the high frequency brazing method is applied, when the heating time is long, there is a problem that the polyethylene sheath 81 is melted by the heat transmitted through the metal pipe 9. At the conventional brazing by using the electric resistance brazing method, the small electrodes 30 and 31 are made to contact the narrow region being near to the tip part 28 of the connector main body 101, and a current is made to flow into the electrodes 30 and 31 and the brazing part is heated. As a result, it takes long time to heat the brazing part up to the designated temperature, and the polyethylene sheath 81 is made to melt. At the conventional brazing by using the high frequency brazing method, the coil 34 must be set at the outside of the ring shaped setscrew 27, therefore the efficiency to generate the induced current is not high, and the long time heating is required. Consequently, the polyethylene sheath 81 may be made to melt.

SUMMARY OF THE INVENTION

It is therefore an object of the present invention to provide a connector and a fixing method thereof, in which a heating time for brazing can be reduced in order to prevent a polyethylene sheath from melting.

According to the present invention, for achieving the objects mentioned above, there is provided a connector, which is used for connecting a tail cable to an instrument, provides a connector main body, which is a cylindrical shape, and in which a penetrating hole is formed in its stretching direction, and a ring shaped setscrew, which is fitted to the outside circumference surface of said connector main body, and said ring shaped setscrew provides a slit, through which a pipe into which said tail cable is inserted can be set, in its stretching direction. And said connector main body provides a collar and at least one groove at its outside circumference surface of said connector main body, and said connector main body can also provides a groove at its end surface.

According to the present invention, there is provided a fixing method of a connector, by which said connector is connected with a tail cable, provides the steps of brazing a pipe in which said tail cable is inserted and the tip part of a connector main body, setting a ring shaped setscrew having slit to said pipe through a slit of said ring shaped setscrew having slit, and fixing said connector main body to a coupling end component by inserting said ring shaped setscrew having slit to an internal thread part of said coupling end component.

According to the present invention, said connector provides said ring shaped setscrew having slit and this slit is in its stretching direction, and said ring shaped setscrew having slit can be set to said pipe through this slit. Therefore, at said brazing process, said tip part of said connector main body and said pipe can be heated without setting said ring shaped setscrew having slit. As a result, electrodes can be made to be large at the electric resistance brazing method, and the diameter of a coil at the high frequency brazing method can be made to be small. Consequently, the heating time can be largely reduced. Therefore, the polyethylene sheath can be prevented from melting, compared with the conventional method.

According to the present invention, without using said ring shaped setscrew having slit, a block having slit or two blocks can be also used. With using said block having slit or said two blocks, the same effect as said ring shaped setscrew having slit has can be achieved.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 10:
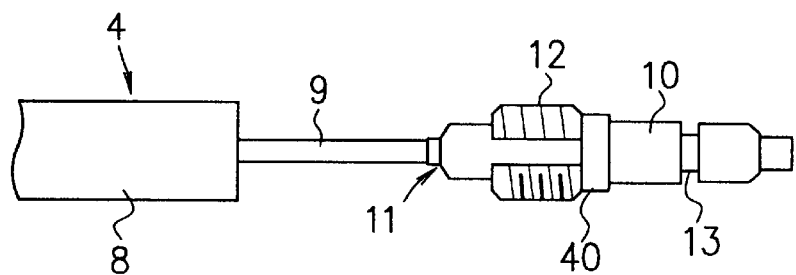
FIG. 10 is a side view showing a state that a connector of the present invention is fixed to the tip of a submarine instrument tail cable.

Referring now to the drawings, embodiments of the present invention are explained in detail. In this, the same reference numbers are used at the embodiments of the present invention, at the same functions as the conventional example and the basic structure have. FIG. 10 is a side view showing a state that a connector of the present invention is fixed to the tip of a submarine instrument tail cable. As shown in FIG. 10, a submarine instrument tail cable 4 provides a polyethylene sheath 8 and a metal pipe 9 in which a core fiber is to be inserted. A connector main body 10 having a penetrating hole is brazed with the metal pipe 9 at a brazing part 11. After brazed the connector main body 10 and the metal pipe 9, an optical fiber is inserted into the metal pipe 9 and the penetrating hole of the connector main body 10. And a ring shaped setscrew having slit 12 is provided at the outside circumference surface of the connector main body 10. The connector main body 10 has a collar 40 and a ring groove 13.

Figure 11:
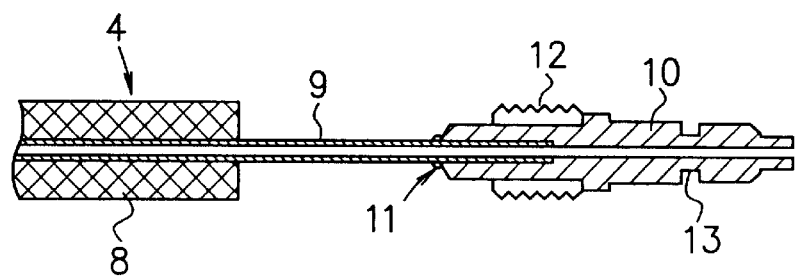
FIG. 11 is a sectional view of FIG. 10.

FIG. 11 is a sectional view of FIG. 10. As shown in FIG. 11, the metal pipe 9 is stuck out from the submarine instrument tail cable 4 and is inserted into the penetrating hole existing at the stretching direction of the connector main body 10. The metal pipe 9 is brazed to the tip part of the connector main body 10 at the brazing part 11.

Figure 12:
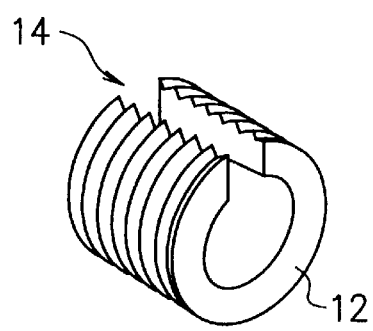
FIG. 12 is a perspective view showing a ring shaped setscrew having slit of the present invention.

FIG. 12 is a perspective view showing the ring shaped setscrew having slit 12. The ring shaped setscrew having slit 12 has a slit 14 in its stretching direction. The slit 14 has the width into which the metal pipe can be inserted. The inside diameter of the ring shaped setscrew having slit 12 is a diameter fitting to the outside diameter of the connector main body 10.

Figure 13:
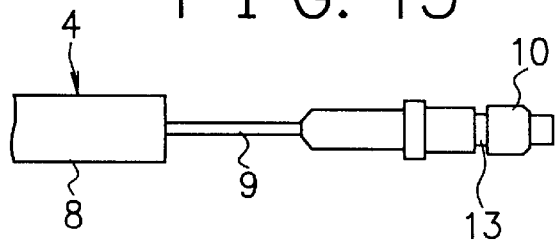
FIG. 13 is a side view showing a structure connecting a connector main body to a metal pipe at the present invention.

Next, referring to FIGS. 13 to 18, a fixing method of the connector is explained. First, as shown in FIG. 13, the metal pipe 9 stuck out from the submarine instrument tail cable 4 is inserted into the penetrating hole of the connector main body 10. At this time, an optical fiber has not been inserted yet into the metal pipe 9. And an O ring, which is set at the ring groove 13, has not been fixed yet. The O ring will be explained later.

Figure 14:
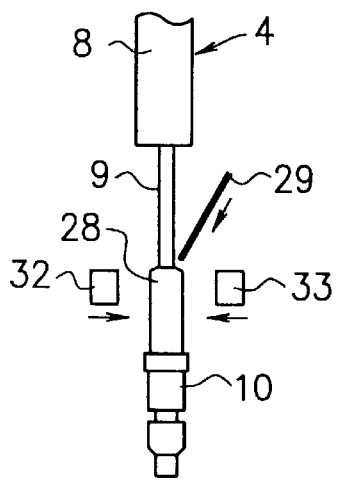
FIG. 14 is a diagram showing a brazing structure by using the electric resistance brazing method at the present invention.

At the case applying the electric resistance brazing method, as shown in FIG. 14, electrodes 32 and 33 are made to contact to the near part of the brazing part of the connector main body 10, and a current is made to flow and the brazing part is heated. After this, a brazing material 29 is given to the brazing part, and the tip part 28 of the connector main body 10 and the metal pipe 9 is brazed. At this state, the ring shaped setscrew having slit 12 has not been fitted to the connector main body 10, therefore the large size electrodes 32 and 33 can be used.

Figure 15:
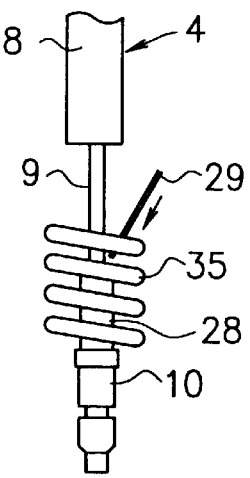
FIG. 15 is a diagram showing a brazing structure by using the high frequency brazing method at the present invention.

On the other hand, at the high frequency brazing method, as shown in FIG. 15, a coil 35 is made to provide at a very near position of the part to be brazed and a high frequency current is made to flow, and the near part of the tip part 28 of the connector main body 10 and the metal pipe 9 are heated by the generation of an induced current, and the brazing is performed. In this case, the ring shaped setscrew having slit 12 has not been fitted to the connector main body 10, therefore the coil 35 can be provided at the very near position to the connector main body 10, as a result, heating with the high efficiency can be performed.

Figure 16:
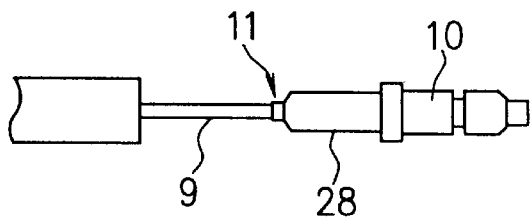
FIG. 16 is a diagram showing a brazing part of the metal pipe and the tip part of the connector main body.
Figure 17:
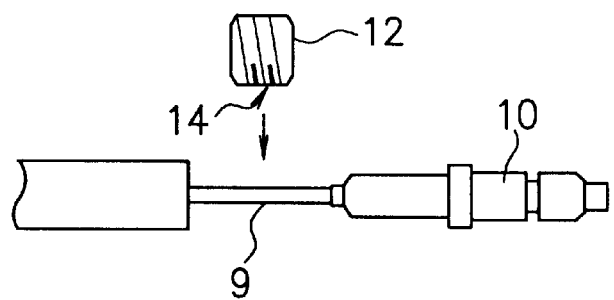
FIG. 17 is a diagram showing a structure setting the ring shaped setscrew having slit to the metal pipe.
Figure 18:
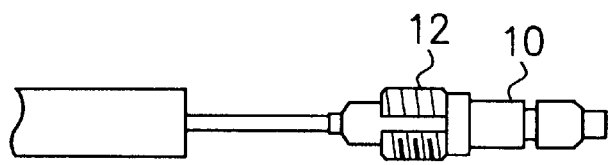
FIG. 18 is a diagram showing a structure fitting the ring shaped setscrew having slit to the connector main body.

By applying one of these methods, as shown in FIG. 16, the tip part 28 of the connector main body 10 and the metal pipe 9 are brazed at the brazing part 11. After this, as shown in FIG. 17, the ring shaped setscrew having slit 12 is set to the metal pipe 9 through the slit 14, and the ring shaped setscrew having slit 12 is fitted to the connector main body 10 as shown in FIG. 18.

As mentioned above, at the assembling method of the connector, the brazing can be performed without fitting the setscrew to the connector main body. That is, the large size electrodes can be contacted to the near part of the brazing part of the connector main body, or the coil, in which the high frequency current flows, can be provided at the near position of the brazing part of the connector main body. As a result, it takes about 20 seconds to braze at the conventional method, but the brazing time can be reduced to about 10 seconds at the present invention. With this, since the brazing part can be heated efficiently in a short time, the resin covering the tail cable can be almost prevented from melting.

Figure 19:
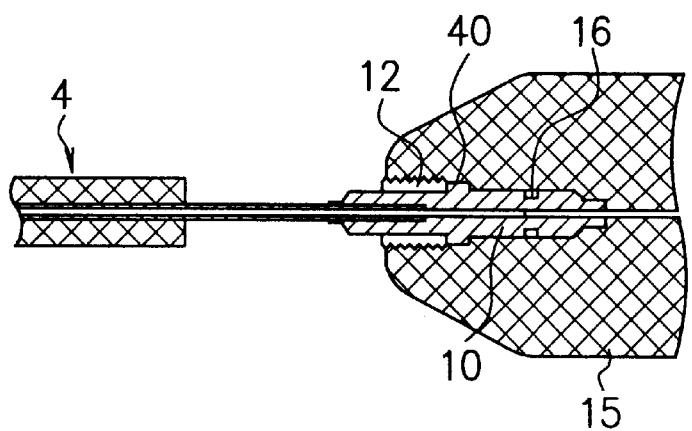
FIG. 19 is a sectional view showing a structure jointed the connector of the present invention and a coupling end component.

FIG. 19 is a sectional view showing a structure jointed the connector of the present invention and the coupling end component 15. The coupling end component 15 provides a hole part fitting to the outside shape of the connector main body 10, and an internal thread fitting to the ring shaped setscrew having slit 12 is provided in the hole part. At the case that these parts are jointed together, first, the connector main body 10 is inserted into the coupling end component 15 and, after this, the both parts are fixed by the ring shaped setscrew having slit 12. In order to make the jointed part watertight construction, the O ring 16 is provided at the ring groove 13 of the connector main body 10.

Figure 20:
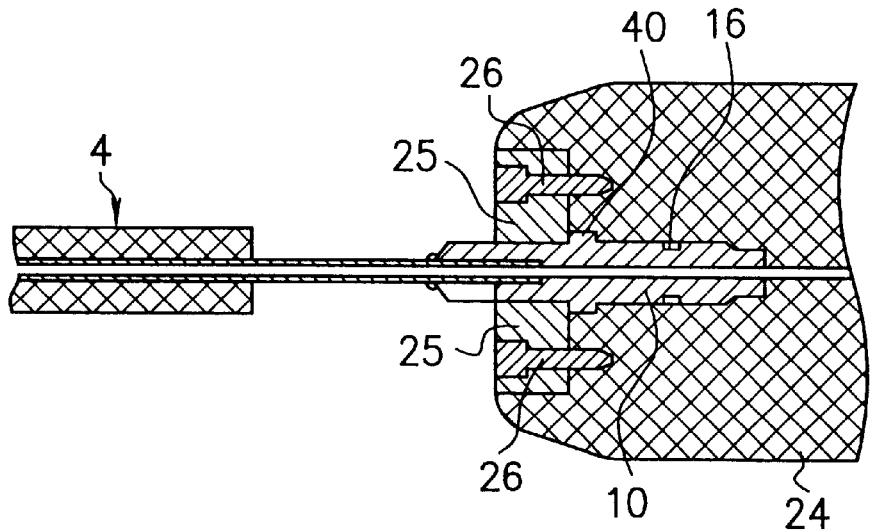
FIG. 20 is a sectional view showing a structure jointed another connector without providing a setscrew having slit and another coupling end component at the present invention.

Another embodiment of the present invention is explained. FIG. 20 is a sectional view showing a structure jointed the connector main body and a coupling end component without providing a setscrew having slit. In this embodiment, a large concave part to which blocks 25 are inserted and screw holes are provided in a coupling end component 24. When the coupling end component 24 and the connector main body 10 are jointed, first, the connector main body 10 is inserted into the coupling end component 24 until the connector main body 10 stops. After this, the blocks 25 are inserted to the concave part of the coupling end component 24, and screws 26 penetrated the blocks 25 makes the connector main body 10 and the coupling end component 24 connect. The blocks 25 can be made of two pieces of a semicircular material. And the block 25 can be also made of one piece of material having slit, through which the metal pipe 9 can be inserted into, as the same as the ring shaped setscrew having slit 12.

Figure 1:
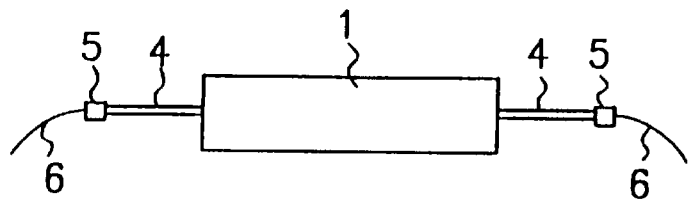
FIG. 1 is a side view showing a basic structure of a submarine apparatus, to which the present invention is applied.
Figure 2:
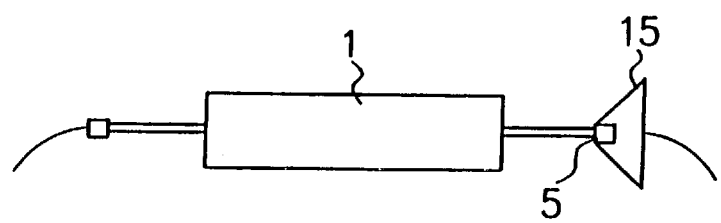
FIG. 2 is a diagram showing a basic structure connecting a connector and a coupling end component.
Figure 3:
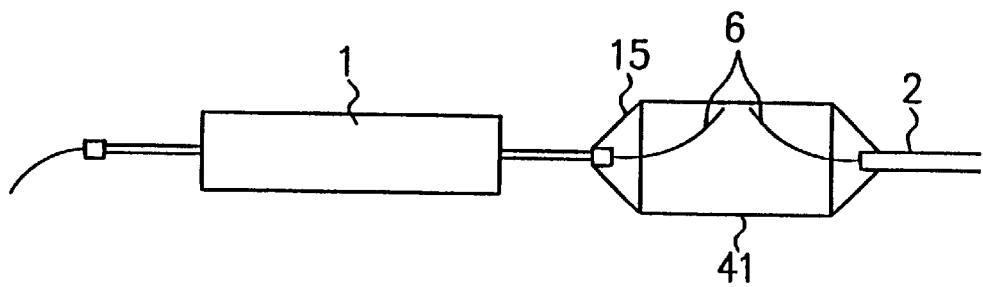
FIG. 3 is a diagram showing a basic structure connecting the coupling end component and a coupling part containing box.
Figure 4:
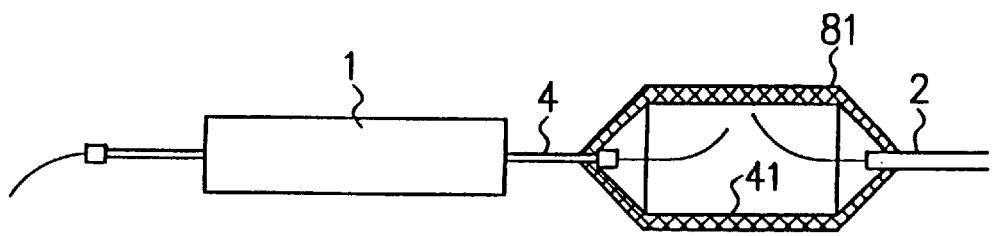
FIG. 4 is a diagram showing a basic structure covering the coupling part containing box with a polyethylene sheath.
Figure 5:
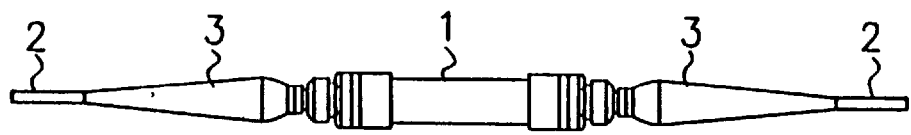
FIG. 5 is a diagram showing a completed basic structure of the submarine apparatus.
Figure 6:
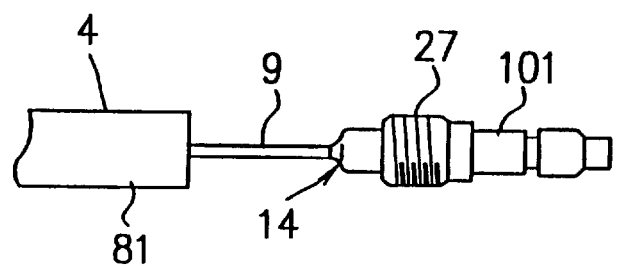
FIG. 6 is a side view showing a structure of a conventional connector.
Figure 7:
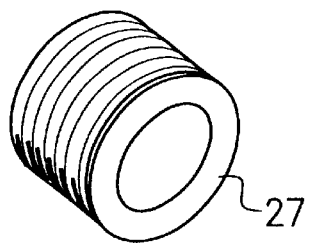
FIG. 7 is a perspective view showing a setscrew using for the conventional connector.
Figure 8:
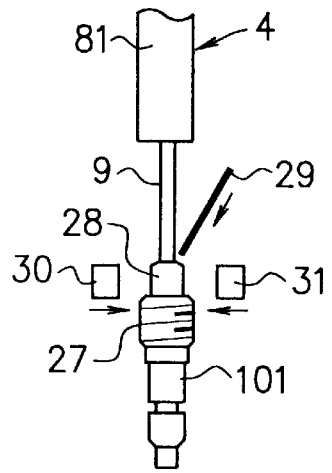
FIG. 8 is a diagram showing a conventional brazing structure by using an electric resistance brazing method.
Figure 9:
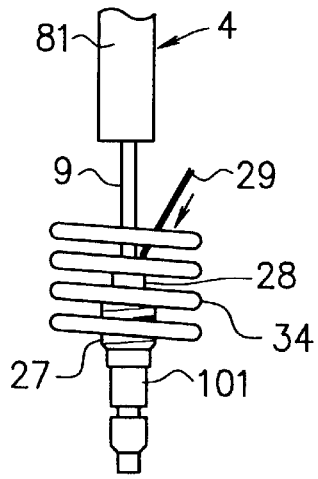
FIG. 9 is a diagram showing a conventional brazing structure by using a high frequency brazing method.
Figure 21:
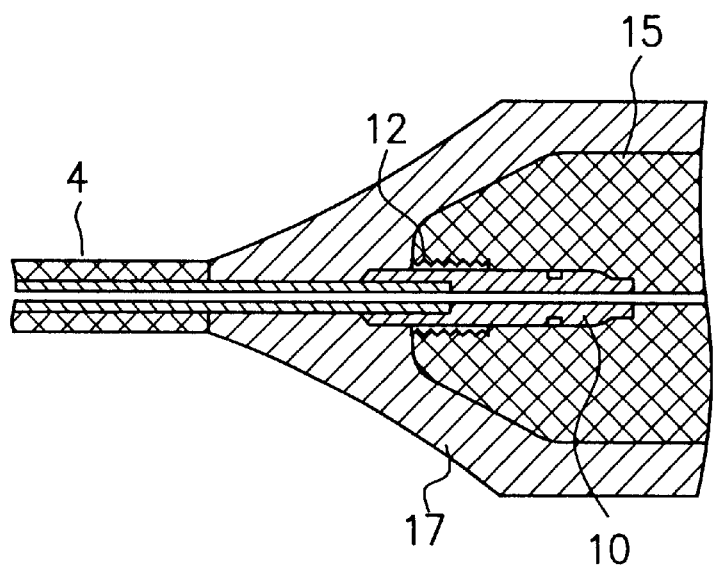
FIG. 21 is a diagram showing a structure covering a polyethylene molding at the border part of the connector and the submarine instrument tail cable at the present invention.

A power supply route for a submarine instrument consists of the metal pipe 9, the connector main body 10, the coupling end component 15, the coupling part containing box 41 and the submarine optical tail cable 2. When this power supply route contacts with seawater, a short circuit occurs. Therefore, the metal part must be covered with a polyethylene sheath. As shown in FIG. 4, the coupling end component 15 and the coupling part containing box 41 must be covered with the polyethylene sheath. As shown in FIG. 21, the border part of the connector and the submarine instrument tail cable 4 is covered with a polyethylene molding 17. And the submarine apparatus is laid in the structure shown in FIG. 5.

Figure 22:
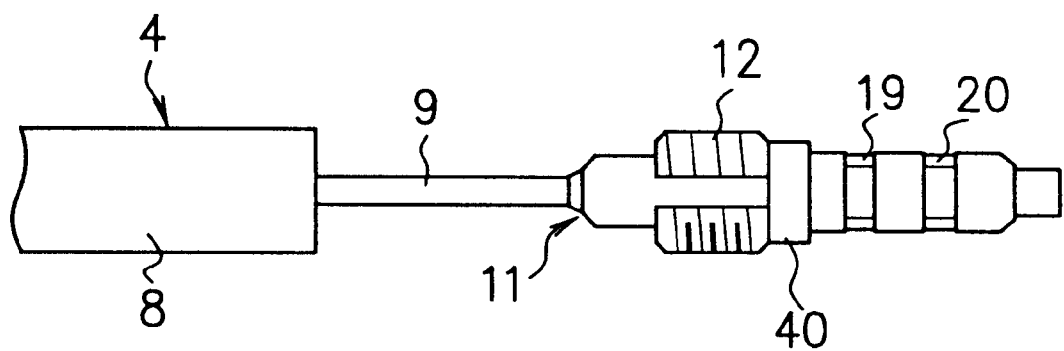
FIG. 22 is a side view showing a structure of a connector main body having two O ring grooves of the present invention.

As shown in FIG. 22, the connector main body 10 can provide two O rings 19 and 20. At the case that the two O rings 19 and 20 are provided, when the connector is inserted into the hole part of the coupling end component 15, its balance becomes stable.

Figure 23:
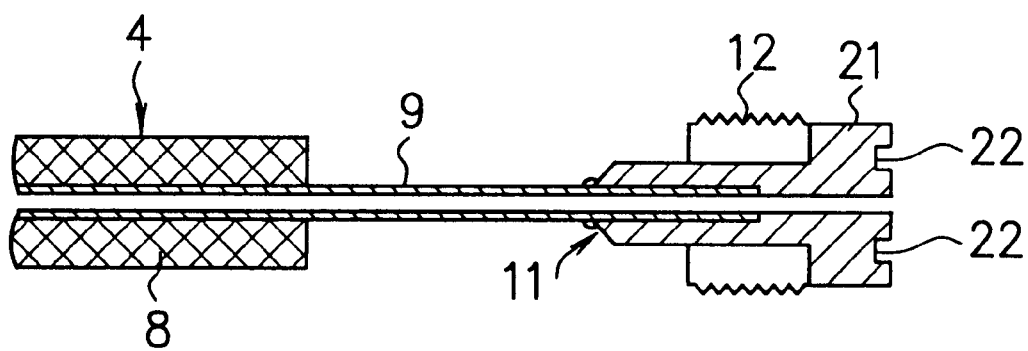
FIG. 23 is a sectional view showing a structure adopted a metal seal to a connector main body of the present invention.

In a long period of time, an O ring made of rubber penetrates a few vapors. At the specifications in which even a few vapors can not be allowed to penetrate, a metal seal must be adopted. FIG. 23 is a sectional view showing a structure adopted a metal seal. As shown in FIG. 23, a ring groove 22, into which a metal O ring or a metal gasket is inserted, is provided at the end surface of a connector main body 21.

At the embodiments mentioned above, the length of the connector main body is about 45 mm and its maximum diameter is about 13 mm. And the length of the setscrew is about 10 mm and its inside diameter is about 5.5 mm. These connector main body and setscrew are made of the same material, such as beryllium copper alloy, phosphor bronze, and stainless steel. The outside diameter of the metal pipe is about 3 to 4 mm and its inside diameter is about 1.8 to 2.2 mm, and the metal pipe is made of a material, such as phosphor deoxidized copper, nickel copper and stainless steel. Both of the connector main body and the metal pipe are made of the same kind of alloy combination, such as, copper alloy combination or ferro-alloy combination. And the length of the submarine apparatus is about 1000 mm and its diameter is about 250 mm, and the outside diameter of the submarine instrument tail cable is about 10 to 12 mm.

According to the present invention, when the connector is brazed at the tip of the submarine instrument tail cable, the heating time can be reduced. Therefore, the insulation film covering the submarine instrument tail cable can be prevented from melting. And the brazing process time can be shortened, as a result, the total process time can be also reduced.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A connector, which is used for connecting a tail cable to an instrument, comprising:

a connector main body, which has a cylindrical shape, and in which a penetrating hole is formed in its stretching direction; and a ring shaped setscrew, which is fitted to the outside circumference surface of said connector main body, wherein said ring shaped setscrew provides a slit, through which a tail cable pipe can be set, in its stretching direction.

2. A connector in accordance with claim 1, wherein:

a collar and a groove are provided at the outside circumference surface of said connector main body.

3. A connector in accordance with claim 1, wherein:

a collar and a plurality of grooves are provided at the outside circumference surface of said connector main body.

4. A connector in accordance with claim 1, wherein:

a groove is formed at the end surface of said connector main body.

5. A connector, which is used for connecting a tail cable to an instrument, comprising:

a connector main body, which has a cylindrical shape, and in which a penetrating hole is formed in its stretching direction;

a coupling end component, to which said connector main body is inserted, and in which a concave part and holes for screws are provided;

a block which provides holes for screws, and fixes said connector main body to said coupling end component; and screws for fixing said block to said coupling end component through which a tail cable pipe can be set, in its stretching direction, and said block is inserted to said coupling end component, and said screws are inserted to said holes for screws of said coupling end component through said screw holes of said block.

6. A connector in accordance with claim 5, wherein:

said block comprises two pieces of components without having a slit.

7. The method of claim 5, wherein said block has a unitary construction having a slit.

8. A fixing method of a connector, by which said connector is connected with a tail cable, comprising:

brazing a pipe in which said tail cable is inserted and the tip part of a connector main body;

setting a ring shaped setscrew having slit to said pipe through a slit of said ring shaped setscrew having slit after brazing the pipe, and fixing said connector main body to a coupling end component by inserting said ring shaped setscrew having slit to an internal thread part of said coupling end component.

9. A fixing method of a connector in accordance with claim 8, wherein:

said brazing process comprises a heating process applying a high frequency at a near part of the tip part of said connector main body and said pipe.

10. A fixing method of a connector in accordance with claim 8, wherein:

said brazing process comprises a heating process applying a current at a near part of the tip part of said connector main body and said pipe.

11. A fixing method of a connector, by which said connector is connected with a tail cable, comprising:

brazing a pipe in which said tail cable is inserted and the tip part of a connector main body;

setting a block having a slit to said pipe through the slit of said block, and fixing said connector main body to a coupling end component by inserting said block to a concave part of said coupling end component, and inserting screws to screw holes of said coupling end component through screw holes of said block.

12. A fixing method of a connector in accordance with claim 11, wherein:

said brazing process comprises a heating process applying a high frequency at a near part of the tip part of said connector main body and said pipe.

13. A fixing method of a connector in accordance with claim 11, wherein:

said brazing process comprises a heating process applying a current at a near part of the tip part of said connector main body and said pipe.

* * * * *